United States Patent [19]

Comte

[11] 4,071,834

[45] Jan. 31, 1978

[54] HELICAL WAVE GUIDE

[75] Inventor: Georges Comte, St. Leu la Foret, France

[73] Assignee: Les Cables de Lyon S.A., Lyon Cedex, France

[21] Appl. No.: 693,928

[22] Filed: June 7, 1976

[30] Foreign Application Priority Data

June 12, 1975 France ................. 75 18402

[51] Int. Cl.² ............................................... H01P 3/13
[52] U.S. Cl. ..................................... 333/95 R; 29/600;
138/122; 138/154; 156/82; 156/175
[58] Field of Search ............. 29/600; 333/95 R, 95 A;
138/129, 131, 134, 139, 122, 133, 154; 156/82,
175, 425

[56] References Cited

U.S. PATENT DOCUMENTS

| 2,045,568 | 6/1936 | Burd .............................. 138/131 X |
| 2,848,695 | 8/1958 | Pierce ............................ 333/95 R |
| 3,106,768 | 10/1963 | Gent et al. .................... 333/95 R X |
| 3,574,015 | 4/1971 | Blee .............................. 156/82 X |
| 3,890,583 | 6/1975 | Bendayan ..................... 333/95 A |

Primary Examiner—Paul L. Gensler
Attorney, Agent, or Firm—Haseltine, Lake & Waters

[57] ABSTRACT

A helical wave guide comprising a hollow conductor coated on its outside with an electrically conductive screen and formed by an electrically conductive wire coated with a thermoplastic insulator, wound in a helix and welded turn by turn by surface melting of the thermoplastic insulator. It is applicable to signal transmission.

1 Claim, 6 Drawing Figures

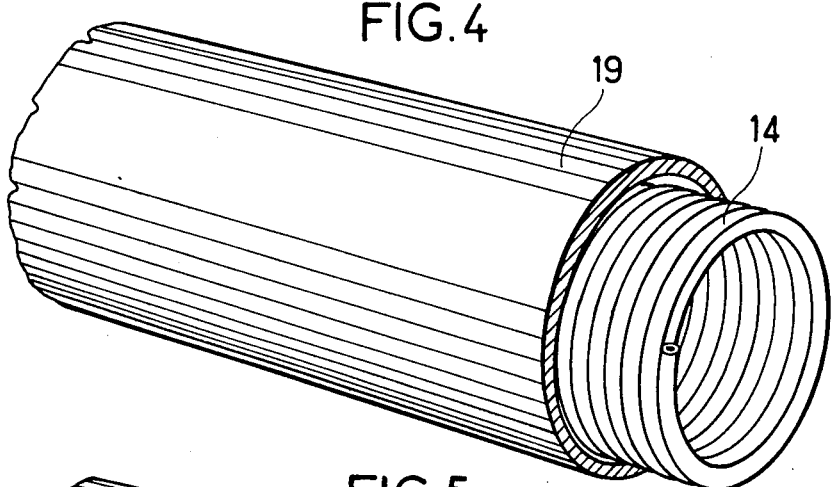
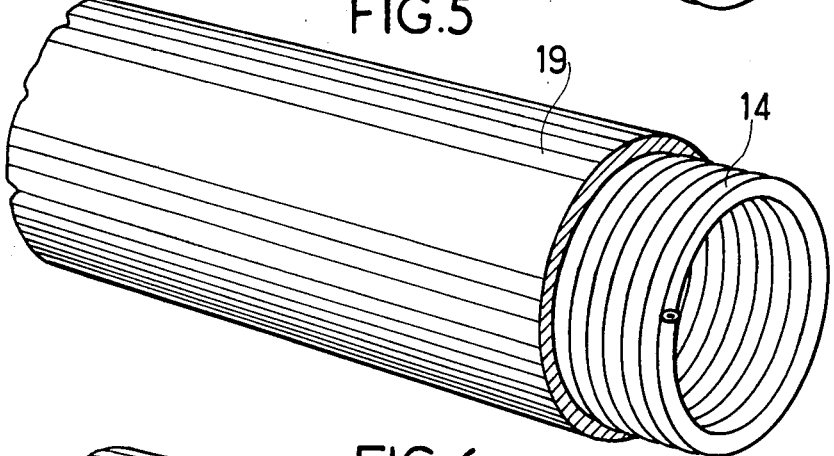
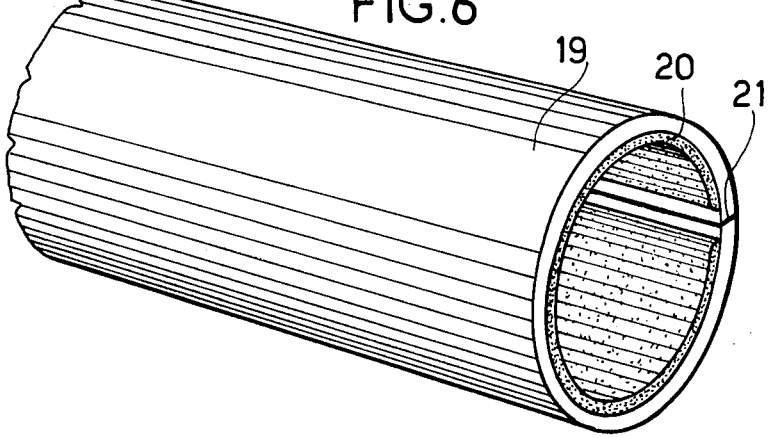

HELICAL WAVE GUIDE

The invention relates to electromagnetic wave guides and, more particularly, to helical wave guides which comprise a hollow conductor coated with a conductive screen and formed by an electrically conductive insulated wire wound in a spiral. This type of wave guide has the property of transmitting the $TE_{01}$ mode to the exclusion of all others.

It has been known for a long time that for helical wave guides, the attenuation of the $TE_{01}$ mode and the level of interference modes depends on the regularity of the internal dimensions of the hollow conductor and on the dielectric losses of the insulator of the wire.

Hollow conductors have been formed of a coil of contiguous turns of an insulated wire wound on a calibrated mandrel and coated with a layer of glue.

This manufacturing method has various disadvantages. The relatively long drying time of glue makes it essential to leave the winding for a relatively long time on the calibrated mandrel, thus complicating manufacture. Moreover, it does not enable the use of insulating materials which are known to have very low dielectric losses, i.e. thermoplastics in the class of polyolefins, e.g. polyethylene, teflon or polypropylene, since these materials do not adhere to gluing agents, more particularly to epoxyde resins. Furthermore, even if the gluing of these materials could be improved by suitable surface treatment, the dielectric losses due to the layer of glue would remain too high to maintain a reduced attenuation.

The aim of the present invention is to avoid the above-mentioned disadvantages and to form a helical wave guide having improved characteristics.

The present invention provides a helical wave guide comprising a conductor which is wound in a helix and is surrounded by a conductive screen, wherein the said conductor is constituted by a wire coated with a thermoplastic insulator and adjacent turns of the helix are welded together by surface melting of the thermoplastic insulator.

The present invention also provides a method for manufacturing a helical wave guide comprising a first step of a hollow conductor by winding with contiguous turns an electrically conductive wire coated with a thermoplastic insulator on a mandrel which is calibrated by means of a winding head and provided with a thrust ring for making the winding slide along the said mandrel as it is being formed and by surface melting of the insulation to weld adjacent turns and a second step of sliding the hollow conductor inside an electrically conductive screen formed by a metallic tube which is of slightly larger diameter, the metallic tube then being swaged so that its inside wall comes flush with the outside of the hollow conductor without deforming the latter by crushing.

Embodiments of the invention are described by way of example with reference to the accompanying drawings, in which:

FIG. 4 is a perspective view of installing the hollow conductor in a screen;

FIG. 5 is a view similar to FIG. 4 of the helical wave guide formed after swaging of the screen; and FIG. 6 shows a variant of the conductive screen shown in FIGS. 4 and 5.

Figure 1:
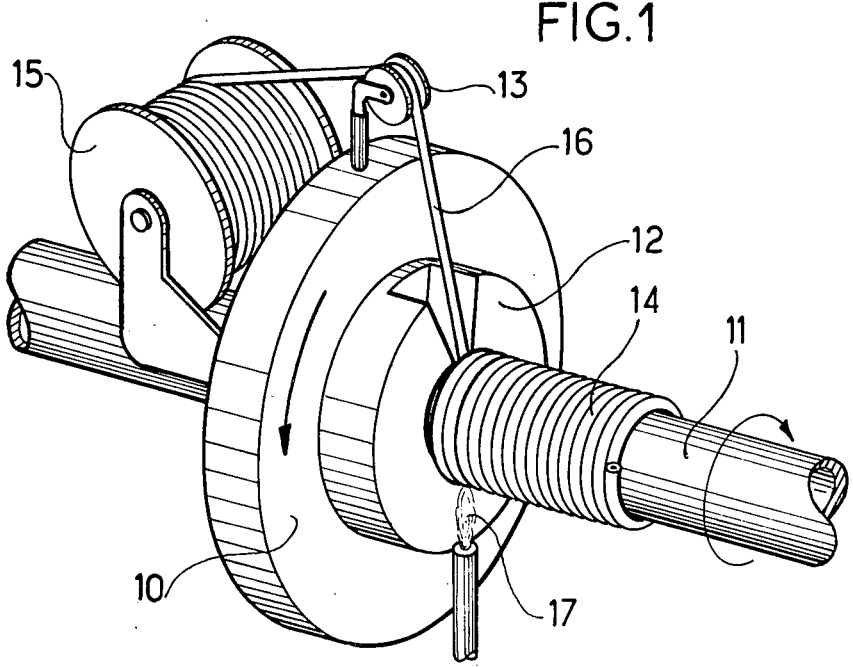
FIG. 1 is a perspective view of a hollow conductor of a spiral wave guide being manufactured.

In a first manufacturing phase the hollow conductor of the helical wave guide is formed. FIG. 1 shows the essential elements of a machine for manufacturing the hollow conductor. The machine comprises a winding head 10 rotating about a mandrel 11 and supporting a spool 15 supplying wire 16; a wire guide device 13; and a thrust ring 12. These elements are known and enable the continuous forming of a winding 14 having contiguous turns. When the winding head 10 rotates in relation to the mandrel 11, the wire 16 supplied by the spool 15 follows the wire guide device 13, passes through an entrance passage provided in the thrust ring 12 and winds round a calibrated part of the mandrel 11, in contact with the thrust ring 12 which bears against the last turn formed to slide the winding 14 being formed along the mandrel 11. The tension of the wire 16 (ensured e.g. by retaining the spool 15) is sufficient for the turns to place themselves regularly and contiguously one after another.

The wire 16 used is not an enamelled wire as has been usual, but is a wire insulated by a thermoplastic advantageously chosen, from among the polyolefines such as e.g. polyethylene, Teflon or propylene. A flame 17 is placed in the vicinity of the most recently wound turns near the thrust ring 12. Under the effect of this flame 17, these turns are heated on their surface as they slide along the mandrel 11 thus ensuring local melting of the insulation and consequent welding together of adjacent turns. The hollow conductor thus formed is cooled before it leaves the calibrated part of the mandrel 11.

Local heating can be obtained by other means. It can be effected by any other suitable means e.g. by concentration of light or infra-red radiation, by blowing a high temperature gas, by contact or by proximity with a hot body, or even by heating at high frequency.

The mandrel 11 is preferably provided with cooling means. It is, for example, hollow and has cold water flowing through it, or it may comprise a heat pipe (energy transport tube) to evacuate rapidly the heat caused by the welding and to facilitate the cooling of the hollow conductor.

The mandrel 11 is advantageously rotated in relation to the heating means 17, to ensure a better regularity in the welding operation.

Figure 2:
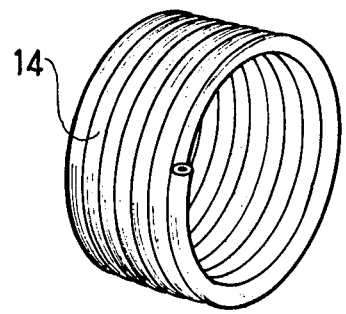
FIG. 2 is a perspective view of a portion of the spiral which constitutes the hollow conductor.
Figure 3:
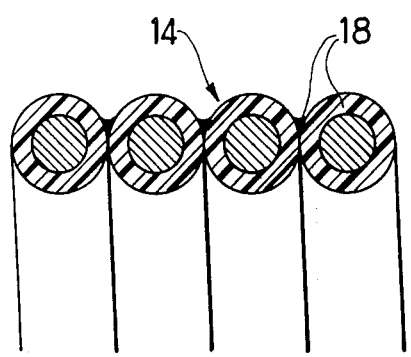
FIG. 3 is an enlarged cross-section of a few adjacent turns of the spiral.

FIG. 2 shows a portion of the winding 14 constituting the hollow conductor of the wave guide and FIG. 3 shows an enlarged cross-section of a few neighbouring turns of this winding. It will be observed, in this latter drawing that the turns are joined by the welding of the insulation 18 on the outside surface of the winding 14.

According to one variant, it is possible, to facilitate the welding together of the insulators of adjacent turns, to overlay the layer of thermoplastic insulator (polyolefine, more particularly) with a second very thin layer of slightly polar insulator of the grafted polyolefine type. This second layer also has the advantage of facilitating possible connection of the hollow conductor with its screen by heat sealing.

In a second manufacturing phase, which can, moreover, be simultaneous with the first, a hollow conductive screen is formed as a metallic tube 19 having thin walls, with a diameter which is slightly greater than that of the winding 14 constituting the hollow conductor. The hollow conductor 14 is slid inside the screen 19 which is cut to length as imposed by transport requirements, swaged by passing through a die to make its inside wall flush with the outside of the winding 14, leaving only a very slight clearance, without there resulting any deformation by crushing of the winding 14 constituting the hollow conductor.

FIG. 4 shows the winding 14 in the tube 19 before swaging and FIG. 5 shows it after swaging.

The tube 19 is preferably made of a metal which is a good conductor, for example aluminium. It can be formed either by drawing from a blank or by butt welding of a thin strip. In one variant, each length of tube is coated, on its inside face, at each of its ends, with a thin layer 20 of a heat sealing material such as grafted polyethylene or a product sold under the trade name Surlyn by Du Pont de Nemours, so as to facilitate the subsequent fixing thereof by heat sealing on the winding 14 an expansible mandrel ensuring, moreover, the maintaining of the winding 14 at the ends of the tube 19 during the operation.

FIG. 6 shows an end of the tube 19 coated, on its inside wall with a layer 20 of heat sealing material; it is observed that the layer of heat sealing material does not reach the edge 21 of the strip constituting the tube 19, the aim of this being to avoid the destruction thereof during the welding operation on the tube 19.

The guide thus constituted can subsequently be protected mechanically, either by drawing in a conduit, or by coating and taping with anticorrosion material, or by insertion in an individual casing provided with connecting flanges at its ends. In the latter case, during the installation, the aluminium tube can be centered in relation to the casing, by expansible mandrels. In the case of wave guides slid into a conduit, the individual sections can be connected together before drawing, by means of outside mandrels, screwed or glued.

Without going beyond the scope of the invention, some of the elements can be changed or replaced by equivalent elements. It is possible, more particularly, to form the screen by means of a metallic cloth or of a non-welded metallic tape. Moreover, reinforcing can be provided by epoxy resin.

What is claimed is:

1. A helical wave-guide having a conductor wound in a helix, and an electrically conductive screen surrounding said conductor comprising: a wire coated with a thermoplastic insulator, adjacent turns of the helix being welded together by surface melting of the thermoplastic insulator, the insulation between adjacent turns degenerating predetermined modes and reducing electromagnetic transmission losses, said surface melting of the thermoplastic insulator providing mechanical bonding and electrical insulation, said thermoplastic insulator including a substantially thin layer of polar material of the grafted polyethylene type coated on the electrically conductive wire having a thermoplastic insulating coating selected from the group of polyolefines consisting of polyethylene, Teflon or polypropylene, said electrically conductive screen being formed by a metallic tube coated at its ends on its inside wall with a substantially thin layer of a heat sealing material for ensuring fixing of the helix inside the screen.

* * * * *